United States Patent [19]
Okubo et al.

[11] 3,892,734
[45] July 1, 1975

[54] NOVEL ANTHRAQUINO[3,2-d]OXAZOLE DYES AND COLORING AGENTS
[75] Inventors: Ichiro Okubo; Michihiro Tsujimoto, both of Tokyo, Japan
[73] Assignee: Mitsui Toatsu Chemicals, Incorporated, Tokyo, Japan
[22] Filed: Mar. 26, 1974
[21] Appl. No.: 455,035

Related U.S. Application Data
[63] Continuation-in-part of Ser. No. 144,658, May 18, 1971, abandoned.

[30]     Foreign Application Priority Data
         May 19, 1970   Japan................................ 45-42107

[52] U.S. Cl..... 260/240 D; 106/288 G; 117/33.5 T; 252/301.2 R; 260/37 P; 260/39 P; 260/40 R; 260/307.5
[51] Int. Cl............................................ C07d 85/48
[58] Field of Search..................... 260/240 D, 307.5

[56]                References Cited
              UNITED STATES PATENTS
1,034,895   8/1912   Friedmann...................... 260/307.5
2,174,072   9/1939   Kranzlein et al.................. 260/307
3,544,564  12/1970   Weidlinger....................... 260/307.5

FOREIGN PATENTS OR APPLICATIONS
77,226    8/1916   Austria

*Primary Examiner*—Arthur P. Demers
*Attorney, Agent, or Firm*—Fisher, Christen & Sabol

[57]            ABSTRACT
Anthraquino[3,2-d]oxazole dyes and coloring agents of the formula:

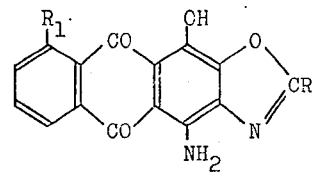

wherein R is alkyl, cyclohexyl, phenyl or styryl, and the benzene nucleus of the phenyl or styryl group may be substituted with methyl or chlorine, $R_1$ is hydrogen and may be an amino group when R is alkyl or cyclohexyl. Specific compounds within the above formula include the following:

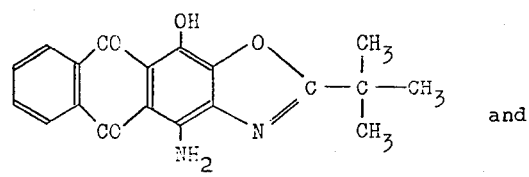

and

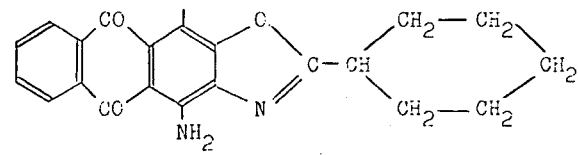

14 Claims, No Drawings

NOVEL ANTHRAQUINO(3,2-D)OXAZOLE DYES AND COLORING AGENTS

CROSS REFERENCE TO RELATED APPLICATION

This application is a continuation-in-part of our application Ser. No. 144,658, filed May 18, 1971 and now abandoned.

BACKGROUND OF THE INVENTION

Field of the Invention

This invention relates to novel dyes and coloring agents and, more particularly, to novel anthraquino[3,2-d] oxazoles which are capable of coloring organic synthetic or natural substrates in clear pink colors emitting fluorescence from orange to red.

SUMMARY OF THE INVENTION

The anthraquino[3,2-d]oxazoles of the present invention are represented by the formula:

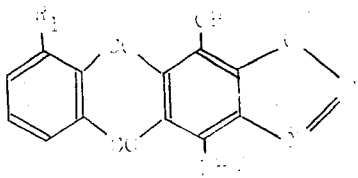

wherein R is alkyl having 1 to 17 carbon atoms, cyclohexyl, phenyl, styryl, or substituted phenyl or styryl wherein the benzene nucleus thereof is substituted with methyl or chlorine, $R_1$ is hydrogen when R is phenyl, styryl, or substituted phenyl or styryl and $R_1$ is hydrogen or amino when R is alkyl having 1 to 17 carbon atoms or cyclohexyl. The anthraquino[3,2-d] oxazoles of this invention are capable of coloring organic synthetic or natural substrates in clear pink colors emitting fluorescence from orange to red.

Organic substrates which can be colored according to the present invention include any high molecular weight compounds which can be practically used as fibrous articles, films, extrudates, coatings, castings or molded articles including synthetic resins such as amino-formaldehyde resins, for example, urea-formaldehyde or melamine-formaldehyde resins, the polymers and copolymers of methacrylic acid esters, the polymers and copolymers of vinyl chloride, the polymers and copolymers of vinylidene chloride, the polymers and copolymers of olefins, for example, polyethylene and polypropylene, styrene polymers and copolymers, polyamide resins, polyester resins, polyacrylic resins, polyacetal resins, cellulose acetate and such natural fibers as wool.

DESCRIPTION OF THE PREFERRED EMBODIMENTS

Typical monovalent substitutes represented by R include alkyl groups having 1 to 17 carbon atoms such as methyl, ethyl, propyl, t-butyl, octyl, nonyl, undecyl, heptadecyl and the like, the cyclohexyl group, phenyl substituents such as phenyl, p-methyl-phenyl, p-chlorophenyl and the like and styryl substituents such as styryl, m-chlorostyryl, p-methylstyryl and the like.

The novel anthraquino[3,2- d] oxazoles of the present invention can be synthesized by the following methods:

A. Anthraquino[3,2-d]oxazoles represented by the formula (I) wherein R is alkyl, cyclohexyl, phenyl or methyl or chloro substituted phenyl.

First, 3-aminoalizarin is boiled with an acyl halide having the formula:

$$X\ COR \qquad (II)$$

wherein R is alkyl having 1 to 17 carbon atoms, cyclohexyl, phenyl, or methyl or chloro substituted phenyl and X represents a halogen atom such as chlorine or bromine, in an organic solvent having a high boiling point, whereby a 2-substituted 11-hydroxy-anthraquino [3,2-d] oxazole having the formula:

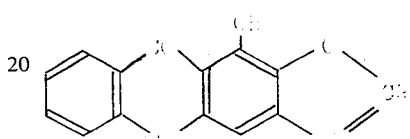

wherein R is as defined in formula (II) is obtained.

Typical acyl halides include those of the formulas:

| | |
|---|---|
| ClCOCH₃ | acetyl chloride |
| ClCOC₂H₅ | propionyl chloride |
| ClCO(CH₂)₂CH₃ | butyryl chloride |
| ClCO—C(CH₃)₃ | pivaloyl chloride |

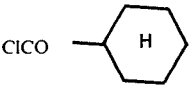

| | |
|---|---|
| ClCO—C₆H₅ | benzoyl chloride |
| ClCO—C₆H₄Cl(p) | p-chlorobenzoyl chloride |
| ClCO—C₆H₄Cl(m) | m-chlorobenzoyl chloride |
| ClCO—C₆H₄CH₃(p) | p-methylbenzoyl chloride |
| ClCO—C₆H₄CH₃(m) | m-methylbenzoyl chloride |
| ClCO(CH₂)₁₆CH₃ | stearoyl chloride |
| ClCO(CH₂)₈CH₃ | decanoyl chloride | and the like.

Suitable high boiling organic solvents include nitrobenzene, o-dichlorobenzene, the xylenes, and the like.

The preparation of 2-substituted 11-hydroxy-anthraquino [3,2-d] oxazoles having the formula (III) is conveniently carried out by mixing 3-aminoalizarin in the organic solvent and heating the resulting mixture to a moderate temperature of about 80°C. or in the general range of from about 50°C. to about 120°C. The acyl halide having the formula (II) is then conveniently added dropwise to the mixture over a period of time, for example, from about 15 minutes to about an hour. The relative amounts of reactants also are not narrowly critical and they can be mixed in stoichiometric amounts. It is, however, preferable to use an excess of acyl halide to insure completion of the reaction and, illustratively, from about 1 to about 2 moles of acyl halide is preferably used per mol of 3-aminoalizarin.

The mixture is then boiled under reflux under atmospheric pressure for several hours, for example, from about 5 to about 10 hours, until sufficient conversion to the desired product has been achieved. After boiling the mixture it is cooled and, if desired, the organic solvent can be distilled of prior to cooling. An alcohol, such as methanol, or other precipitant is added to precipitate the desired product which is then filtered off, washed and further refined by recrystallization from a suitable solvent such as ortho-dichlorobenzene and/or by vacuum sublimation to provide the desired product of formula (III).

In order to introduce the nitro group, the thus obtained 2-substituted 11-hydroxy-anthraquino[3,2-d] oxazole having the formula (III) is nitrated using any suitable procedure, many of which are known for nitrating aromatic compounds. For example, the refined product is readily nitrated by mixing it with fuming nitric acid and concentrated sulfuric acid while maintaining the temperature at a low level by cooling, for example, with ice and agitating for from about one to four hours, after which the temperature can be increased and the mixture held at a higher temperature, for example, from about 50°C. to room temperature, for from one to several hours.

Shorter reaction times, lower temperatures, and smaller relative amounts of acid result in the introduction of a single nitro group in the 4-position for each 2-substituted 11-hydroxy-anthraquino[3,2-d] oxazole molecule, whereby a 2-substituted 4-nitro-11-hydroxy-anthraquino[3,2-d] oxazole having the formula:

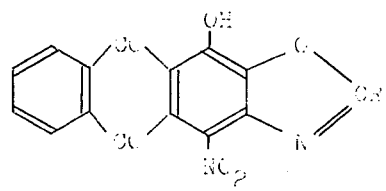

wherein R is as defined in formula (II) is obtained.

Furthermore, when R is alkyl or cyclohexyl, longer reaction times, higher temperatures, and higher relative amounts or higher concentrations of acid result in the introduction of two nitro groups in the 4,6- and 4,9-positions for each 2-substituted 11-hydroxy-anthraquino[3,2-d] oxazole molecule, and by recrystallization, a 2-substituted 4,9-dinitro-11-hydroxy-anthraquino[3,2-d] oxazole having the formula:

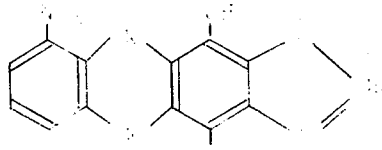

wherein R is alkyl having 1 to 17 carbon atoms or cyclohexyl is obtained. However, when R is phenyl or methyl or chloro substituted phenyl, longer reaction times, higher temperatures, and higher relative amounts or higher concentrations of acid result in the introduction of nitro groups not only in the anthraquinone ring but also in the benzene nucleus of the phenyl group of R, and thus is undesirable.

After nitration, the resulting nitroanthraquino[3,2-d] oxazoles of formula (IV) or (V) can be reduced to convert the nitro group to the amino group. Any suitable reduction method, many of which are well known, can be used. Illustratively, acid-etched iron powder can be mixed with the nitrated product and a suitable solvent such as monochlorobenzene or butylcellosolve, and the resulting mixture boiled under reflux at atmospheric pressure for several hours, for example, from about 3 to about 10 hours. After boiling, the mixture can be filtered off and the filtrate discharged into ice water to precipitate the reduced product which can then be filtered, washed and dried. Alternatively, after boiling, the mixture can be made acidic, can be steam distilled to drive off the solvent, then boiled for several hours in a large amount of dilute aqueous acid, e.g., 10% hydrochloric acid, for several hours, then water added, and solids filtered, dried and extracted with a suitable solvent to produce the desired reduced product as the hydrochloride which, upon recrystallization from a mixture of suitable solvents such as dimethyl formamide and orthodichlorobenzene, provides the desired 2-substituted 4-amino-11-hydroxy-anthraquino[3,2-d] oxazole or 2-substituted 4,9-diamino-11-hydroxy-anthraquino[3,2-d] oxazole.

By using the methods described above, 2-methyl-11-hydroxy-anthraquino[3,2-d] oxazole is prepared by reacting 3-aminoalizarin with acetyl chloride and then is nitrated to produce 2-methyl-4-nitro-11-hydroxy-anthraquino[3,2-d] oxazole which is then reduced to produce 2-methyl-4-amino-11-hydroxy-anthraquino[3,2-d] oxazole (Compound 1). This compound will dye polyester fibers, for example, to provide clear shade emitting fluorescence. It provides a pink shade, showing clear tone and emitting yellow to orange fluorescences. Articles dyed with this compound also have superior light-fastness.

B. Anthraquino[3,2-d] oxazoles represented by the formula (I) wherein R is styryl or methyl or chloro substituted styryl.

First, a 2-methyl-4-nitro-11-hydroxy-anthraquino[3,2-d] oxazole is obtained by the method described above in (A). This compound is condensed with benzaldehyde or a methyl or chloro substituted derivative thereof whereby the compound having the formula:

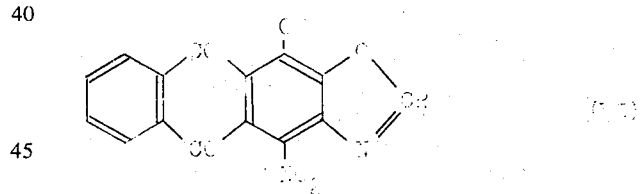

wherein R is styryl or methyl or chloro substituted styryl is obtained. Examples of the benzaldehyde compound used include benzaldehyde, p-chlorobenzaldehyde, m-chlorobenzaldehyde, p-methyl-benzaldehyde, m-methylbenzaldehyde, and the like.

The condensation reaction can be carried out by boiling under reflux at atmospheric pressure the 2-methyl-4-nitro-11-hydroxy-anthraquino[3,2-d] oxazole with the aldehyde in an organic solvent having a high boiling point, for example, o-dichlorobenzene, nitrobenzene etc., and a suitable condensation agent, for example, zinc chloride, zinc bromide, p-toluene sulfonic acid, etc. After the condensation reaction, the resulting compound of formula (VI) can be reduced to convert the nitro group to the amino group in the same manner described above in (A) whereby a 2-substituted 4-amino-11-hydroxy-anthraquino[3,2-d] oxazole is obtained.

The novel compounds of this invention are soluble in organic solvents and their solutions emit a yellow or red fluorescence even under a diffused light. Typical examples of compounds of this invention are shown in Table I although the present invention is not limited thereto. In Table I the melting points for the various compounds are given as well as the shade of a polyester fabric dyed therewith using a dyeing procedure such as that described in Examples 8, 9 and 13.

Examples of fluorescence spectra and absorption spectra as spectroscopic properties of the anthraquino[3,2-d] oxazoles of the present invention are shown for illustration purposes in Tables II and III. Table II shows effects of amino substituents on the maximum wave length of the fluorescence spectrum of compounds in which the substituent in the 2-position is Table I

| Compound No. | Structural formula | Melting point (°C.) | Shade of the dyed polyester article |
|---|---|---|---|
| 1 | | 286–286.5 | Pink |
| 2 | | 300 | Pink |
| 3 | | 300 | Pink |
| 4 | | 300 | Pink |
| 5 | | 256–258 | Orange pink |
| 6 | | 188–190 | Violet pink |

Table I

| Compound No. | Structural formula | Melting point (°C.) | Shade of the dyed polyester article |
|---|---|---|---|
| 7 | (structure: anthraquino-oxazole with -C-CH=CH-phenyl and NH₂) | 297–299 | Pink |
| 8 | (structure: anthraquino-oxazole with -C-CH(cyclohexyl) and NH₂) | 252.5–253.5 | Orange pink |
| 9 | (structure: anthraquino-oxazole with two NH₂ groups and -C-CH(cyclohexyl)) | 245–247 | Violet pink | a tert-butyl group. Table III shows the effects of the presence or absence of an amino group in the 4-position on the maximum wave length of the absorption spectrum of the compound in which the substituent in the 2-position is a phenyl group.

Organic substrates can be easily colored with the novel anthraquino[3,2-d] oxazole compounds of this invention by any ordinarily practiced method. For example, fibrous materials, such as yarns and fabrics, can be colored by fixing at 50° to 140°C. in an aqueous me-

Table II

| Compound No. | Structural formula | Maximum wave length in mμ (a) of the fluorescence spectrum | Wave lengths in mμ (a) of the exciting light |
|---|---|---|---|
| — | (structure: anthraquino-oxazole — $C(CH_3)_3$) | 575 | 402 |
| 5 | (structure: anthraquino-oxazole with NH₂ — $C(CH_3)_3$) | 597 | 340, 465, 530 |
| 6 | (structure: anthraquino-oxazole with two NH₂ — $C(CH_3)_3$) | 610 | 340, 465, 570 |

(a) O-dichlorobenzene-benzene solution.

Table III

| Compound No. | Structural formula | Maximum wave length in mμ (a) of the absorption spectrum |
|---|---|---|
| — | (2-phenyl-11-hydroxyanthraquino[3,2-d]oxazole structure) | 396 |
| 2 | (2-phenyl-4-amino-11-hydroxyanthraquino[3,2-d]oxazole structure) | 508 |

(a) Methanol-dimethyl formamide solution.

dium by the conventional exhausting method or at a proper temperature (e.g. 70° tp 200°C.) consistent with the type of fiber using dry heat by the conventional thermosol method. When the organic substrate to be colored is a film, coating, casting or a molded or extruded article, it can be colored by adding and mixing the novel anthraquino[3,2-d] oxazole compound into the high molecular weight substance, i.e., resin or polymer, from which it is made during its preparation or before or during formation of the substance into the film, coating, casting or molded or extruded article. Also, a resin based pigment having a yellow or red fluorescent color can be obtained by mixing the novel anthraquino [3,2-d] oxazole into the resin or polymer or other properly selected organic material in molten form.

Of the novel anthraqunio[3,2-d] oxazole compounds of this invention represented by formula (I) wherein R is alkyl having 1 to 17 carbon atoms, the compounds of formula (I) wherein R is alkyl having 1 to 4 carbon atoms are particularly preferred for the purpose of coloring not only fibrous materials such as yarns and fabrics but also films, coatings, castings, molded articles and extruded articles of the high molecular weight substance, i.e., resin or polymer. However, compounds of formula (I) wherein R is alkyl having 5 to 17 carbon atoms are useful for the purpose of coloring films, coatings, castings, molded articles and extruded articles of a resin.

The following examples are presented in which all parts are on a weight basis and the compound Nos. refer to the compounds identified and characterized in Table I.

EXAMPLE 1

Synthesis of
2-phenyl-4-amino-11-hydroxy-anthraquino[3,2-d] oxazole (Compound 2)

A. 10 parts (0.039M) of 1,2-dihydroxy-3-aminoanthraquinone (alizarin maroon) were powdered and warmed to 80°C. in 50 parts of nitrobenzene. 10 parts (0.072M) of benzoyl chloride were dropped therein over a period of 30 minutes. The resulting mixture was boiled for 7 hours while being agitated and then left to cool. Then 50 parts of methanol were added and the mixture was filtered off. The precipitate obtained was dried and recrystallized from orthodichlorobenzene, or vacuum sublimated, to provide long orange yellow columnar crystals of 2-phenyl-11-hydroxyanthraqunio[3,2-d] oxazole. The structure of this product was confirmed by elemental analysis.

B. 1 part of the thus prepared 2-phenyl-11-hydroxyanthraquino[3,2-d] oxazole was dissolved in 5 parts of concentrated sulfuric acid. A mixture of 0.5 part of concentrated sulfuric acid and 0.3 part of fuming nitric acid was dropped into the solution under ice cooling over a period of 30 minutes. The solution was agitated under ice cooling for 1 hour and at room temperature for 2 hours. Then the ice water was discharged. The resulting precipitate was filtered off, was agitated and boiled in a large amount of water and was again filtered off and dried to provide 2-phenyl-4-nitro-11-hydroxyanthraquino[3,2-d] oxazole. This compound was recrystallized from orthodichlorobenzene to provide dark orange columnar crystals. The degree of nitration was followed by separating the nitrated compound and the unreacted starting material in an aliquot by a silica gel lamina chromatograph with a solvent containing benzene and glacial acetic acid in a weight ratio of 19:1.

C. 0.7 part of iron powder was etched with a small amount of hydrochloric acid and water and 1 part of the nitrated compound was added. The resulting mixture was mixed with 10 parts of monochlorobenzene and the resulting mixture was boiled under reflux. Then the mixture was made acidic by the addition of hydrochloric acid and was steam-distilled to drive off the monochlorobenzene. The residue was boiled in a large amount of 10% hydrochloric acid for several hours. Then, water was added and solids were filtered off, dried and then extracted with orthodichlorobenzene. The product was extracted as the hydrochloride but was recrystallized from a mixture of dimethyl formamide and orthodichlorobenzene whereby 2-phenyl-4-amino-11-hydroxyanthraquino[3,2-d] oxazole (Compound 2) was separated as violet black columnar crystals. By selecting proper conditions, sodium sulfide or

EXAMPLE 2

Synthesis of
2-t-butyl-4,9-diamino-11-hydroxyanthroquino[3,2-d]
oxazole (Compound 6).

A. The procedure described in Example 1A was followed with the exception that pivaloyl chloride was substituted on a mol for mol basis for benzoyl chloride to produce 2-t-butyl-11-hydroxyanthraquino[3,2-d] oxazole as long orange yellow crystals.

B. 2 parts of the thus obtained 2-t-butyl-11-hydroxyanthraquino[3,2-d] oxazole were mixed with 10 parts of concentrated sulfuric acid and, while the mixture was being well agitated under ice-cooling, a mixture of 1.7 parts of fuming nitric acid and 3 parts of concentrated sulfuric acid was carefully added to it over a period of 30 minutes. The mixture was agitated under ice-cooling for 1 hour and was then gradually warmed to 50°C. to 60°C. over a period of 1 hour. It was agitated at this temperature for 6 hours and then was discharged into a large amount of ice water. The resulting precipitate was filtered off, was water-washed, agitated and heated with a large amount of hot water, filtered off, water-washed and dried. When it was recrystallized from xylene, there was obtained 2-t-butyl-4,9-dinitroanthraquino[3,2-d] oxazole as yellow needle crystals having a melting point of 270° to 272°C.

C. 1 part of the dinitro compound was mixed with 5 parts of monochlorobenzene. A solution obtained from 1.5 parts of sodium sulfide (of a purity of about 60%) and 5 parts of water was added to the mixture. The mixture was agitated for 5 hours and was then boiled under reflux. 4.5 parts of acid sodium sulfite were added to neutralize the mixture. Then, 1.2 parts of concentrated hydrochloric acid were added to make the mixture acidic. It was then steam-distilled to drive off the monochlorobenzene and the residue was filtered off, water-washed and dried. It was extracted with xylene. Xylene was distilled from the xylene solution and methanol was added to the residue to obtain 2-t-butyl-4,9-diamino-11-hydroxyanthraquino[3,2-d] oxazole (Compound 6) as metallic lustrous violet red columnar crystals having a melting point of 188° to 190°C. Its benzene solution showed a violet pink color having a red fluorescence.

EXAMPLE 3

Synthesis of
2-methyl-4-amino-11-hydroxyanthraquino[3,2-d]
oxazole (Compound 1)

A. The procedure described in Example 1A was followed with the exception that acetyl chloride was substituted on a mol for mol basis for benzoyl chloride to produce 2-methyl-11-hydroxyanthraquino[3,2-d] oxazole.

B. The thus obtained compound was the nitrated using the reagents and procedures described in Example 1B to produce 2-methyl-4-nitro-11-hydroxyanthraquino[3,2-d] oxazole.

C. The thus obtained nitro compound was then reduced using the reagents and procedures described in Example 1C to produce Compound 1.

EXAMPLE 4

Synthesis of
2-styryl-4-amino-11-hydroxyanthraquino[3,2-d]
oxazole (Compound 7).

A. 3.1 parts of 2-methyl-4-nitro-11-hydroxanthraquino[3,2-d] oxazole obtained by the method described in Example 3B were boiled together with 10 parts of o-dichlorobenzene, 2 parts of benzaldehyde and 0.2 parts of zinc chloride for 8 hours. Then 30 parts of methanol were added and the mixture was left to cool. The deposit was filtered off, washed with acetone and dried to obtain 2-styryl-4-nitro-11-hydroxyanthraquino[3,2-d] oxazole. It was recrystallized from o-dichlorobenzene as yellow flaky crystals having a melting point higher than 300°C.

B. 3 parts of 2-styryl-4-nitro-11-hydroxyanthraquino [3,2-d] oxazole as obtained in A were mixed with 50 parts of butyl-cellosolve and 3 parts of an iron powder etched with a small amount of 5% acetic acid and the mixture was agitated and boiled for 8 hours and filtered off. When the filtrate was discharged into a large amount of ice water, a red precipitate was produced. This was filtered off, water-washed and dried to obtain 2-styryl-4-amino-11-hydroxyanthraquino[3,2-d] oxazole (Compound 7) as a red powder having a melting point of 297° to 299°C. Its maximum absorption (in dimethyl formamidemethanol) was between 324 and 479 m$\mu$ and its maximum fluorescence as a benzene solution was at 547 m$\mu$.

EXAMPLE 5

Synthesis of
2-(para-chlorophenyl)-4-amino-11-hydroxyanthraquino[3,2-d] oxazole (Compound 3)

A. The procedure described in Example 1A was followed with the exception that para-chlorobenzoyl chloride was substituted on a mol for mol basis for benzoyl chloride to produce 2-(para-chlorophenyl)-11-hydroxyanthraquino[3,2-d] oxazole.

B. The thus obtained 2-(para-chlorophenyl)-11-hydroxyanthraquino[3,2-d] oxazole was nitrated using the reagents and procedures described in Example 1B to produce 2-(para-chlorphenyl)-4-nitro-11-hydroxyanthraquino[3,2-d] oxazole.

C. The thus obtained nitro compound was then reduced using reagents and procedures described in Example 1C to produce Compound 3.

EXAMPLE 6

Synthesis of
2-t-butyl-4-amino-11-hydroxyanthraquino[3,2-d]
oxazole (Compound 5)

A. The procedure described in Example 1A was followed with the exception that pivaloyl chloride was substituted on a mol for mol basis for benzoyl chloride thereby producing 2-t-butyl-11-hydroxyanthraquino[3,2-d] oxazole.

B. The thus prepared compound was then nitrated using the procedures and reagents described in Example 1B to produce 2-t-butyl-4-nitro-11-hydroxyanthraquino[3,2-d] oxazole.

C. The thus prepared nitro compound was then reduced using the reagents and procedures described in Example 1C thereby producing Compound 5.

EXAMPLE 7

Synthesis of 2-(para-methylphenyl)-4-amino-11-hydroxyanthraquino[3,2-d] oxazole (Compound 4)

A. The procedure described in Example 1A was followed with the exception that para-methylbenzoyl chloride was substituted on a mol for mol basis for benzoyl chloride to produce 2-(para-methylphenyl)-11-hydroxyanthraquino[3,2-d] oxazole.

B. The thus prepared compound was then nitrated using the reagents and procedures described in Example 1B to produce 2-(para-methylphenyl)-4-nitro-11hydroxyanthraquino[3,2-d] oxazole.

C. The thus prepared nitro compound was then reduced using the reagents and procedures in Example 1C to produce Compound 4.

EXAMPLE 8

1 part of Compound 1 was ground together with 0.5 part of an alkyl benzene sulfonate, or alkylarylpolyoxyethylene ether, surface active agent and 2 parts of water for a sufficient time to provide a finely granulated powder which was diluted with sufficient water to provide 10 parts of a finely granulated aqueous dispersion. 2 parts of this dispersion were added to an aqueous bath containing 1 part of a higher alcohol sulfate surface active agent to provide a treatment bath. A polyester fabric was immersed in this treating bath, maintained at 130°C. for 40 minutes and was water-washed and dried. The obtained dyed fabric showed a clear pink color having an orange fluorescence and its light-fastness was higher than the 6th grade.

EXAMPLE 9

1 part of the finely granulated sample obtained in Example 8 was dispersed in 20 parts of water containing 0.04 part of a polyoxyethylene alkyl ether surface active agent. A polyester fabric was dipped in this aqueous dispersion and impregnated with the dispersion at a pick-up of 40 to 50%. This treated fabric was dried, heat-treated at 180°C. for 1 minute, washed with a dilute surface active agent solution and was water-washed and dried to provide a dyed fabric similar to that obtained in Example 8.

EXAMPLE 10

In the same manner as described in Example 8, instead of the polyester fabric, a polyamide fabric was treated at 98°C. and a polyacetate fabric was treated at 80°C. to obtain respectively the same effects as obtained in Example 8.

EXAMPLE 11

20 parts of an unmodified melamine formaldehyde resin were mixed into 50 parts of a sulfonamide resin melted at 120°C. The resulting mixture was heated to 170° to 180°C. and 1 part of Compound 2 was mixed into the mixture. The mixture was rendered completely molten, then cooled, solidified and crushed to obtain a pink fluorescent pigment emitting an orange fluorescence.

EXAMPLE 12

1 part of Compound 7 was ground for a long period of time together with 0.5 part of an alkyl benzene sulfonate, or alkylarylpolyoxyethylene ether, surface active agent and 2 parts of water so as to be finely granulated. It was then well diluted with 6.5 parts of water and dispersed. 2 parts of this dispersion were added into 500 parts of an aqueous bath containing 1 part of a higher alcohol sulfate surface active agent to provide a treating bath. 10 parts of a polyester fabric were put into this bath and treated therewith at 130°C. for 40 minutes. The treated fabric was water-washed and dried. The obtained dyed fabric showed a clear pink color having a reddish fluorescence and its light-fastness was higher than 6th grade.

EXAMPLE 13

1 part of the finely granulated material obtained in Example 12 was dispersed in 20 parts of water containing 0.04 part of a polyoxyethylene alkyl ether surface active agent. A polyester fabric was dipped in this aqueous dispersion so as to be impregnated with the dispersion at a pick-up of 40 to 50%, dried and heat-treated at 180°C. for 1 minute, washed with a dilute surface active agent and water-washed and dried to obtain a dyed fabric similar to that obtained in Example 8.

EXAMPLE 14

In the same manner as described in Example 12, instead of the polyester fabric, a polyamide fabric and an acetate fabric were treated with the dispersion respectively at 98° and 80°C. to obtain the same dyed effect.

EXAMPLE 15

A uniform mixture consisting of 0.1 part of 2-heptadecyl-4-amino-11-hydroxyanthraquino[3,2-d] oxazole, 50 parts of polyvinyl chloride and 50 parts of dioctyl phthalate was kneaded at 150°C. for 10 minutes and was pressed between metal plates heated to 160°C. for 5 minutes to provide a sheet of a thickness of about 0.5 mm. The obtained sheet showed a clear orange pink color emitting an orange fluorescence.

What is claimed is:

1. Anthraquino[3,2-d] oxazole having the formula:

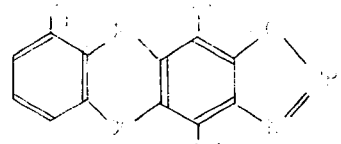

wherein R is alkyl having 1 to 17 carbon atoms, cyclohexyl, phenyl styryl or substituted phenyl or styryl wherein the benzene nucleus thereof is substituted with methyl or chlorine, $R_1$ is hydrogen when R is phenyl, styryl, or substituted phenyl or styryl, and is hydrogen or amino when R is alkyl having 1 to 17 carbon atoms or cyclohexyl.

2. Anthraquino[3,2-d] oxazole as claimed in claim 1 wherein R is alkyl having 1 to 4 carbon atoms, phenyl, styryl or substituted phenyl or styryl wherein the benzene nucleus thereof is substituted with methyl or chlorine and $R_1$ is hydrogen.

3. Anthraquino[3,2-d] oxazole as claimed in claim 2 wherein R is alkyl having 1 to 4 carbon atoms.

4. Anthraquino[3,2-d] oxazole as claimed in claim 3 having the formula:

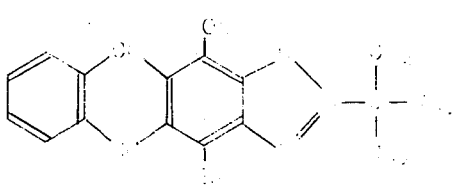

5. Anthraquino[3,2-d] oxazole as claimed in claim 3 having the formula:

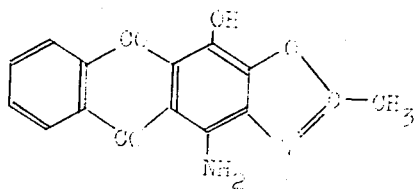

6. Anthraquino[3,2-d] oxazole as claimed in claim 2 wherein R is phenyl or substituted phenyl wherein the benzene nucleus thereof is substituted with methyl or chlorine.

7. Anthraquino[3,2-d] oxazole as claimed in claim 6 having the formula:

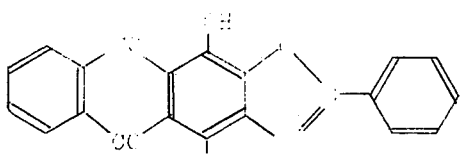

8. Anthraquino[3,2-d] oxazole as claimed in claim 2 wherein R is styryl or substituted styryl wherein the benzene nucleus thereof is substituted with methyl or chlorine.

9. Anthraquino[3,2-d] oxazole as claimed in claim 8 having the formula:

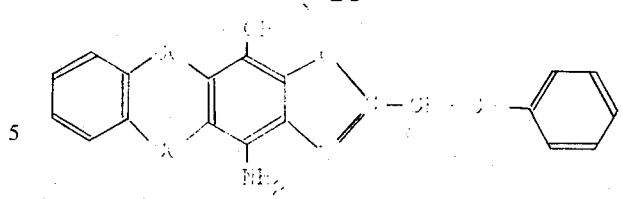

10. Anthraquino[3,2-d] oxazole as claimed in claim 1 wherein R is cyclohexyl.

11. Anthraquino[3,2-d] oxazole as claimed in claim 10 having the formula:

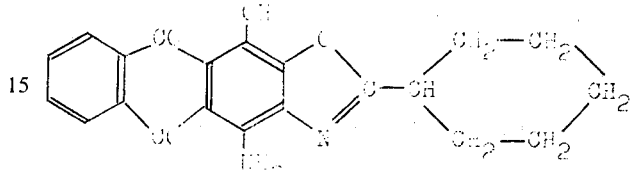

12. Anthraquino[3,2-d] oxazole as claimed in claim 10 having the formula:

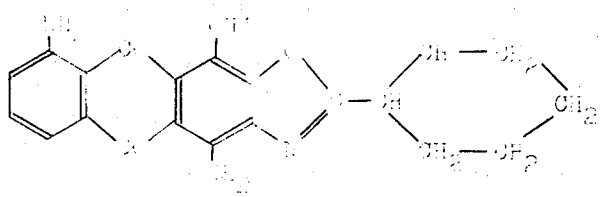

13. Anthraquino[3,2-d] oxazole as claimed in claim 1 wherein R is alkyl having 1 to 17 carbon atoms.

14. Anthraquino[3,2-d] oxazole as claimed in claim 13 having the formula:

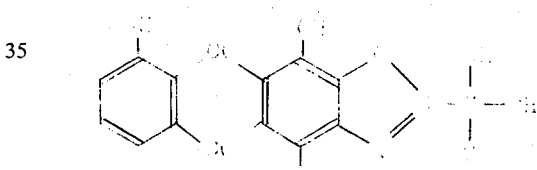

* * * * *